US008533585B2

(12) United States Patent
Buczek

(10) Patent No.: US 8,533,585 B2
(45) Date of Patent: *Sep. 10, 2013

(54) SYSTEM AND METHOD FOR FREEZING COLUMNS AND ROWS IN A UI TABLE

(75) Inventor: Tomasz Buczek, Oakville (CA)

(73) Assignee: Blackberry Limited, Waterloo (CA)

( * ) Notice: Subject to any disclaimer, the term of this patent is extended or adjusted under 35 U.S.C. 154(b) by 577 days.

This patent is subject to a terminal disclaimer.

(21) Appl. No.: 12/827,466

(22) Filed: Jun. 30, 2010

(65) Prior Publication Data

US 2010/0269031 A1    Oct. 21, 2010

Related U.S. Application Data

(63) Continuation of application No. 11/538,144, filed on Oct. 3, 2006, now Pat. No. 7,779,346.

(51) Int. Cl.
*G06F 17/00* (2006.01)

(52) U.S. Cl.
USPC .......................................................... 715/227

(58) Field of Classification Search
USPC .................................. 715/212, 227, 228, 830
See application file for complete search history.

(56) References Cited

U.S. PATENT DOCUMENTS

| 5,706,449 | A | * | 1/1998 | Liu et al. ................. 715/823 |
| 5,971,580 | A | | 10/1999 | Hall et al. |
| 6,005,573 | A | | 12/1999 | Beyda et al. |
| 6,313,848 | B1 | * | 11/2001 | Hoag ........................ 345/684 |
| 6,683,626 | B1 | | 1/2004 | Abellera |
| 6,738,787 | B2 | | 5/2004 | Stead |
| 6,820,077 | B2 | | 11/2004 | Godfredsen et al. |
| 6,966,037 | B2 | | 11/2005 | Fredriksson et al. |
| 7,143,340 | B2 | * | 11/2006 | Brid ............................ 715/227 |
| 7,216,291 | B2 | | 5/2007 | Kim |
| 7,447,987 | B2 | | 11/2008 | Sauermann |
| 7,587,666 | B2 | * | 9/2009 | Delvat et al. ................. 715/227 |
| 7,930,323 | B2 | * | 4/2011 | Brookler et al. ............. 707/805 |
| 8,250,460 | B1 | * | 8/2012 | Ho et al. ...................... 715/212 |
| 2002/0013786 | A1 | | 1/2002 | Machalek |
| 2004/0010751 | A1 | * | 1/2004 | Merkel et al. ................ 715/509 |
| 2004/0176905 | A1 | * | 9/2004 | Sanqunetti et al. .......... 701/200 |
| 2004/0268227 | A1 | * | 12/2004 | Brid ............................ 715/504 |
| 2005/0198568 | A1 | | 9/2005 | Matsuzaki |

(Continued)

OTHER PUBLICATIONS

Office Action issued by the Canadian Intellectual Property Office dated Feb. 27, 2009 for corresponding Canadian Patent Application No. 2,604,981.

(Continued)

*Primary Examiner* — Cong-Lac Huynh
(74) *Attorney, Agent, or Firm* — Gowling Lafleur Henderson LLP

(57) ABSTRACT

Displaying tabular information in a user interface (UI) on a display screen is enhanced by freezing selected non-adjacent columns (rows). Freezing ensures the display of the selected non-adjacent columns (rows) when scrolling to bring other columns (rows) into the table for display. Border rows (columns) may also be frozen when scrolling. A table in a document navigable by moving a focus to scroll the document may be displayed by a UI control configured to automatically display the frozen border rows (columns). When scrolling a focus in the document at an edge of the display screen to bring the UI control into the display, the UI control aligns a portion of the table with the edge and paints the frozen border row (column). The UI control maintain the display of the border row (column) when scrolling through the table.

21 Claims, 11 Drawing Sheets

(56) References Cited

U.S. PATENT DOCUMENTS

| | | | |
|---|---|---|---|
| 2005/0216504 A1* | 9/2005 | Delvat et al. | 707/103 R |
| 2006/0048073 A1 | 3/2006 | Jarrett et al. | |
| 2006/0090125 A1 | 4/2006 | Becker | |
| 2006/0206824 A1 | 9/2006 | Landschaft et al. | |
| 2007/0079230 A1 | 4/2007 | Vignet | |
| 2007/0260532 A1* | 11/2007 | Blake, III | 705/35 |
| 2008/0028290 A1 | 1/2008 | Suwiryo | |
| 2008/0040687 A1 | 2/2008 | Randall | |
| 2008/0046803 A1 | 2/2008 | Beauchamp et al. | |
| 2009/0144607 A1* | 6/2009 | Chen | 715/227 |
| 2009/0187815 A1* | 7/2009 | Becerra et al. | 715/212 |
| 2009/0313537 A1 | 12/2009 | Fu et al. | |
| 2010/0211564 A1* | 8/2010 | Cohen et al. | 707/722 |
| 2011/0276867 A1* | 11/2011 | Machalek | 715/212 |
| 2012/0151317 A1* | 6/2012 | Ho et al. | 715/217 |
| 2012/0197755 A1* | 8/2012 | Felder | 705/26.8 |

OTHER PUBLICATIONS

Extended European Search and Examination Report issued by the European Patent Office dated Jan. 31, 2007 for corresponding European Patent Application No. 06121681.8.

O'Reillypub: "Chapter 6. Viewing and Printing Worksheets", Dec. 2004, pp. 1-7, XP007901558, the whole document.

IBM Technical Disclosure Bulletin, IBM Corp. New York, US, "Moving Split Bar in a Customized Details View", Dec. 1, 1991, vol. 34, No. 7A pp. 426-428, XP000255654, ISSN: 0018-8689, the whole document.

Active Widgets Forum, "Grid Size Problem", Jan. 25, 2006, XP007901546.

Second Examination Report issued by the European Patent Office dated Dec. 14, 2007 for corresponding European Patent Application No. 06121681.8.

Third Examination Report issued by the European Patent Office dated Oct. 14, 2008 for corresponding European Patent Application No. 06121681.8.

* cited by examiner

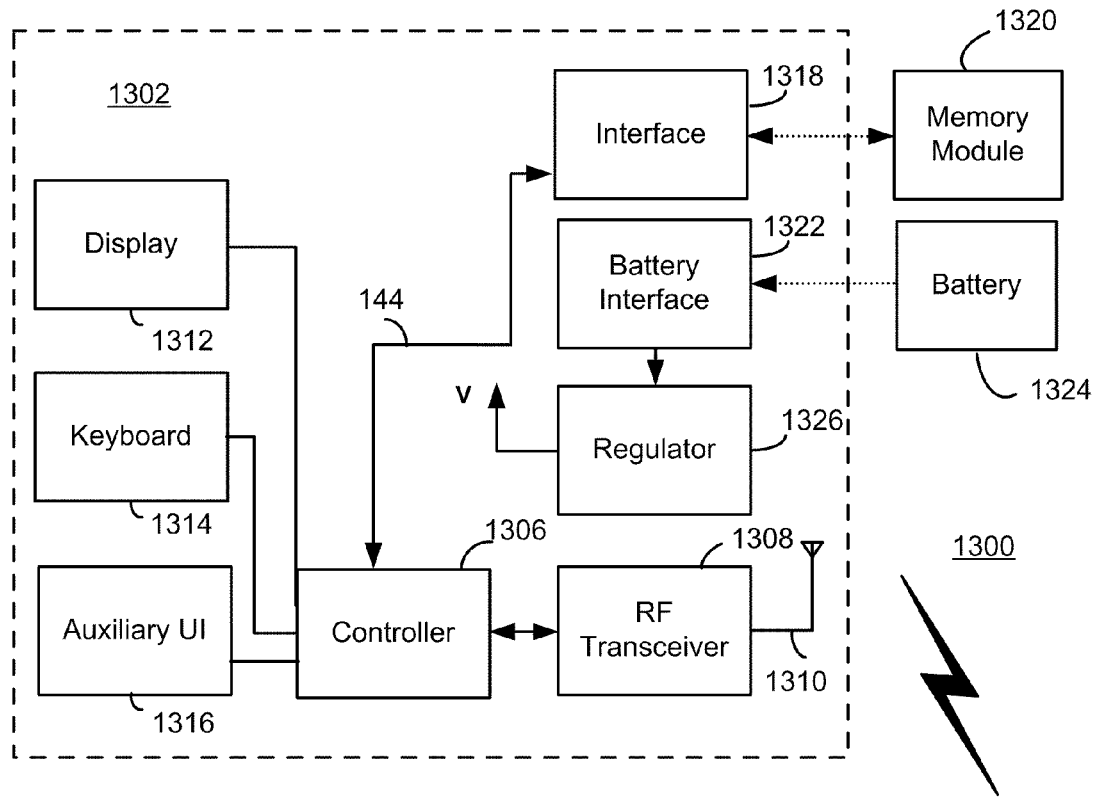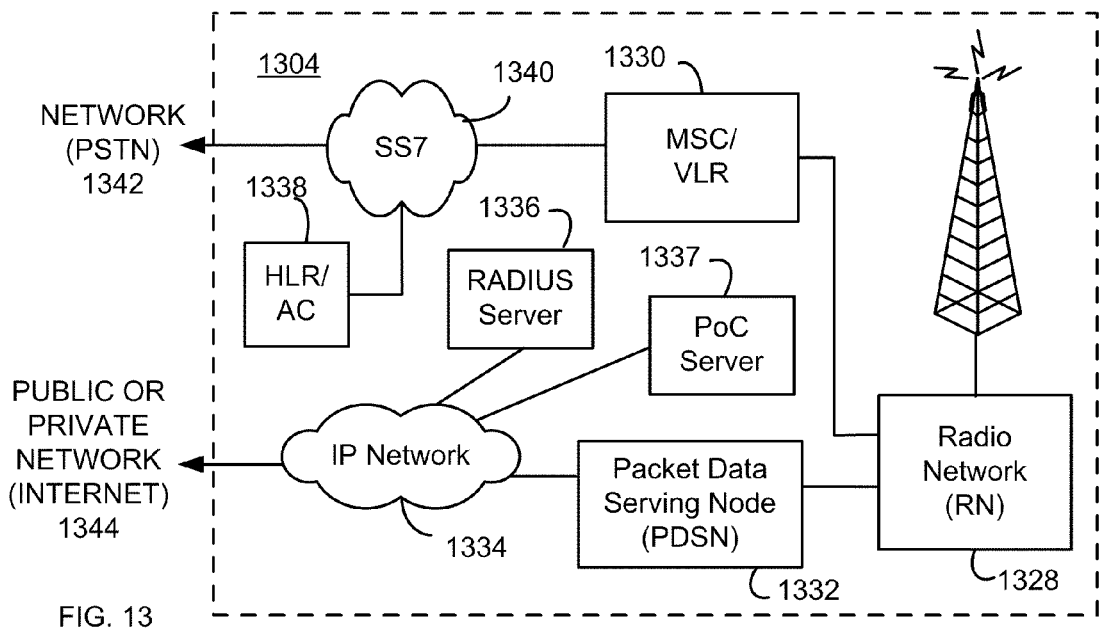
FIG. 13

SYSTEM AND METHOD FOR FREEZING COLUMNS AND ROWS IN A UI TABLE

CROSS REFERENCE TO RELATED APPLICATION

This application is a continuation of earlier non-provisional application having application Ser. No. 11/538,144 filed Oct. 3, 2006 now U.S. Pat. No. 7,779,346, issued on Aug. 17, 2010, and claims priority under 35 U.S.C. 120 thereto. The disclosure of aforementioned application Ser. No. 11/538,144 is hereby incorporated by reference in its entirety.

FIELD

The present application relates to displaying information in tabular form in a user interface (UI) of a computing device, for example, a wireless handheld device.

BACKGROUND

Devices such as personal computers, handheld devices including wireless mobile devices (cellular phones, PDAs, etc.) among others, typically have a display device (i.e. a display screen) for presenting information content to users. Content may be part of a UI for an application or the operating system for the device, for example, and may include information displayed in a tabular form. Spreadsheets are one example of tabular information where information is displayed in rows and columns of a table.

The size of the screen (i.e. the overall screen dimensions at a particular resolution) often limits the amount of information that may be viewed at any one time. That is, additional rows and/or columns cannot be viewed without scrolling to bring the additional information into view on the screen. Often, it is difficult for a user to relate information in columns to the right with information in columns to the left (or vice versa) when the table to be displayed is larger than the screen since these columns may not be viewed at once. Scrolling back and forth may be confusing and provide an unsatisfactory comparison. A similar result occurs when there are too many rows to be displayed at once.

Some UIs for displaying tables of information provide options to a user to selectively "hide" or "unhide" particular columns (or rows) to turn on or off the display of such information. However, turning off the display of some of the columns (rows) in the table may not be sufficient to ensure that the information of interest is always displayed on the screen when scrolling among the columns and rows.

Other user options allow the freezing of a user sizable upper pane and/or leftmost pane. In this way, column or row labels may remain visible during scrolling. A user may select an upper pane of the first one or few adjacent rows of the table or a leftmost pane of the first one or a few adjacent columns to freeze. Respectively, a top horizontal pane is frozen to show column headings or a left vertical pane is frozen to show row headings while scrolling. In some interfaces an upper and left pane may be both frozen to show both column and row headings. Freezing ensures that at least a portion of the applicable rows and/or columns are displayed while scrolling and scrolling to show other rows or columns will not displace the frozen panes. However, information of interest in columns (rows) of interest that are not adjacent but are separated by intervening columns (rows) may not be frozen to appear simultaneously on the screen while scrolling.

As well, UI tables may appear in other documents for selectively displaying in the UI such as when scrolling through the document. When scrolling to or within such tables, it is desirable to be able to view table heading information to assist with an understanding of the tabular information.

A solution that addresses one or more of these issues is therefore desired.

BRIEF DESCRIPTION OF THE DRAWINGS

In order that the subject matter may be readily understood, embodiments are illustrated by way of examples in the accompanying drawings, in which:

FIG. 13 is a block diagram which illustrates pertinent components of an example wireless communication network and a wireless handheld communication device that communicates within the network and that is an example of a computing device that may be adapted to present table user interface controls in accordance with the teachings herein.

DETAILED DESCRIPTION

Displaying tabular information in a user interface (UI) on a display screen is enhanced by freezing selected non-adjacent columns (rows). Freezing ensures the display of the selected non-adjacent columns (rows) when scrolling to bring other columns (rows) into the table for display. Border rows (columns) may also be frozen when scrolling. A table in a document navigable by moving a focus to scroll the document may be displayed by a UI control configured to automatically display the frozen border rows (columns). When scrolling a focus in the document at an edge of the display screen to bring the UI control into the display, the UI control aligns a portion of the table with the edge and paints the frozen border row (column). The UI control maintains the display of the border row (column) when scrolling through the table.

Figure 1:
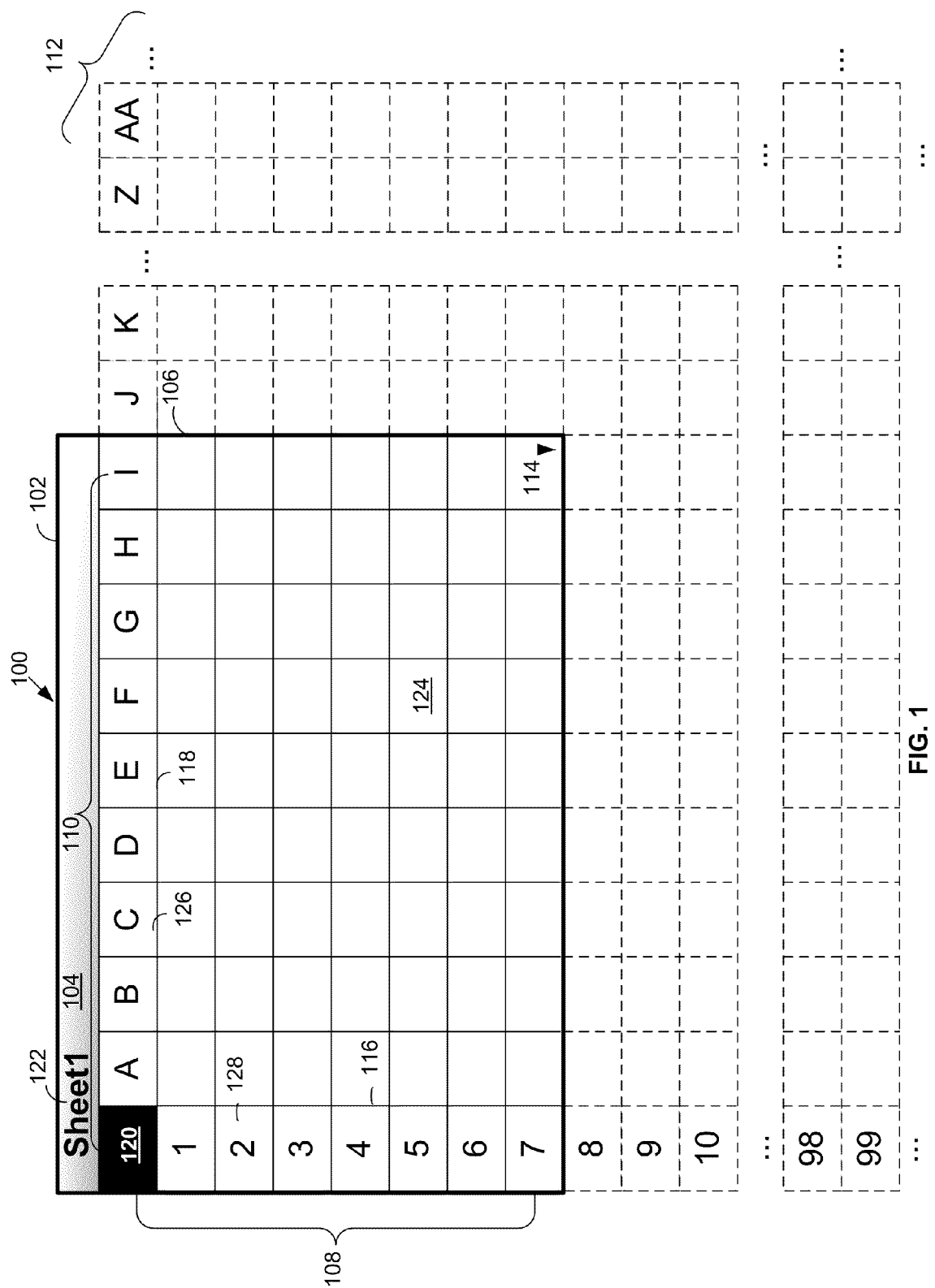
FIGS. 1-5 illustrate views of a user interface for displaying information in tabular form configured for freezing selected non-adjacent columns in a table in accordance with an embodiment.

FIGS. 1-5 illustrate representative views of a UI for displaying information in tabular form, such as, but not limited to, a spreadsheet software application on a computing device. View 100 of FIG. 1 shows a display screen 102 for displaying a table 112 of information. In the representative UI, display screen 102 is divided to present an information bar 104 and a main table window 106 for displaying rows 108 and columns 110 of the table 112. In the representative view, display area or size (width and height) of display screen 102 is insufficient to show all of the columns and rows of the table 112 simultaneously. Dotted lines indicate additional portions of the table that may be displayed such as by moving a focus (e.g. 120) about the rows and columns to bring the other desired portions into the main table window 106. A scroll indicator 114 provides a visual queue that additional rows are available to be displayed, for example.

In the present embodiment, the rows and columns are referenced by numbers 116 and letters 118 respectively, as is common in many spreadsheets, to identify specific cells such as F5 (124). Optionally, the display of the references 116 and 118 may be turned off (not shown) such as by a user option.

A focus 120 (like a cursor) is provided with which a user may move about the main table window 106 using an input device associated with the computing device. A representative wireless communication device that may be adapted in accordance with the embodiments discussed herein is described further below (see FIGS. 13-14). The focus 120 may be moved to a specific cell to display the content of the cell in information bar 104 (display of content not shown). When focus 120 is over a specific column reference (e.g. "C" 126) or row reference (e.g. "2" 128), it may facilitate selection of the respective column or row as the active column or row for a particular action, etc. When focus 120 is not over an individual cell, (e.g. over a row or column reference) information bar 104 may display a name of all or part of the spreadsheet document being displayed (e.g. Sheet1 122).

In accordance with the embodiment shown in FIGS. 1-5, focus 120 may be moved to a desired column of table 122 and a user option invoked to freeze the active column for display in window 106 even if the user scrolls to bring other columns into the window 106. The user may move focus 120 to activate and freeze a plurality of columns, including non-adjacent columns, as described further.

Figure 2:
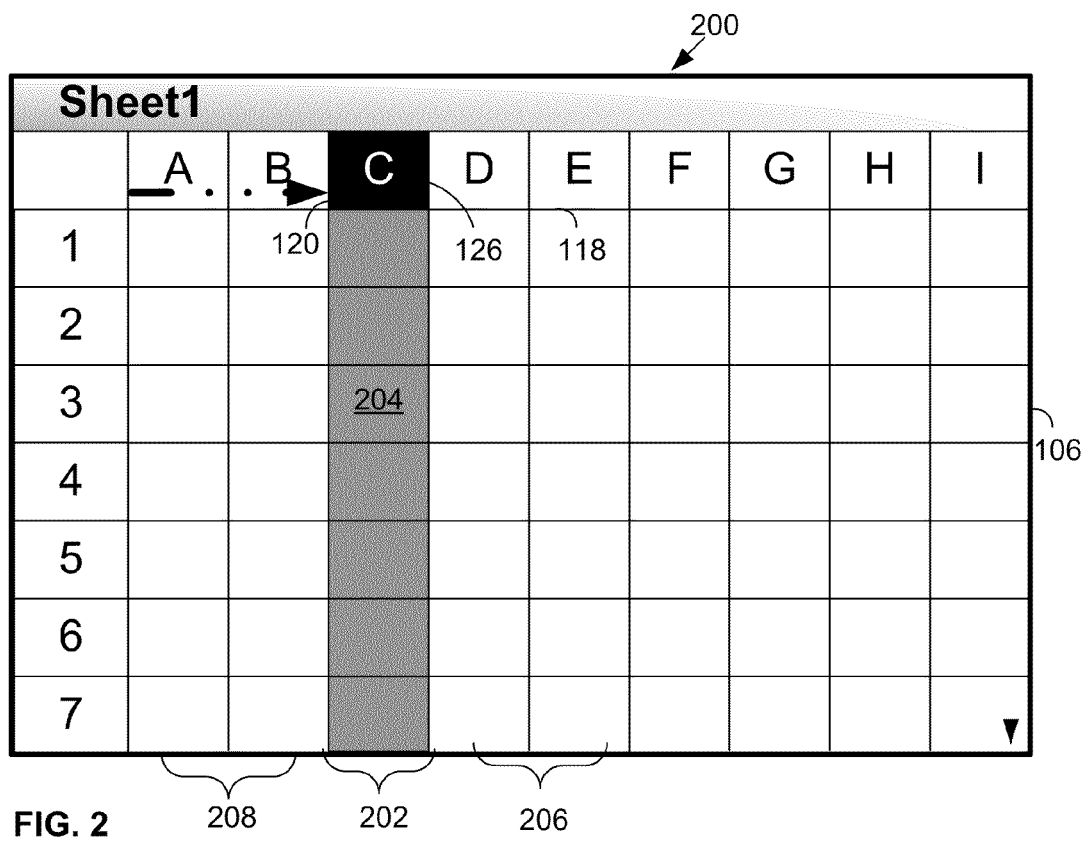

View 200 of FIG. 2 shows focus 120 moved to column C 202 at reference 126 to make this column active. For clarity, view 200 shows only displayable portions of table 122 that fit in main table window 106. As well, the direction of the focus move is indicated by a dash/dot line.

Upon invoking a user option (e.g. through a pop-up menu, etc. (not shown)) to select column C 202 for freezing, at least a portion of the column will remain displayed in window 106 even as a user scrolls horizontally to bring other columns not presently displayed into window 106. It is understood that any portions of the column in rows above or below the edges of the table may be brought into the display by scrolling up or down as applicable.

To visually denote that column C 202 is frozen, the background 204 is shaded. Other manners may be used to denote a frozen column (e.g. colour, font or size change to content displayed in the column, among others). Though not shown, a focus may also be brought to a frozen column to turn off the freezing option. Typically a binary or other flag is set (or unset) to denote a frozen (or "unfrozen") column.

Figure 3:
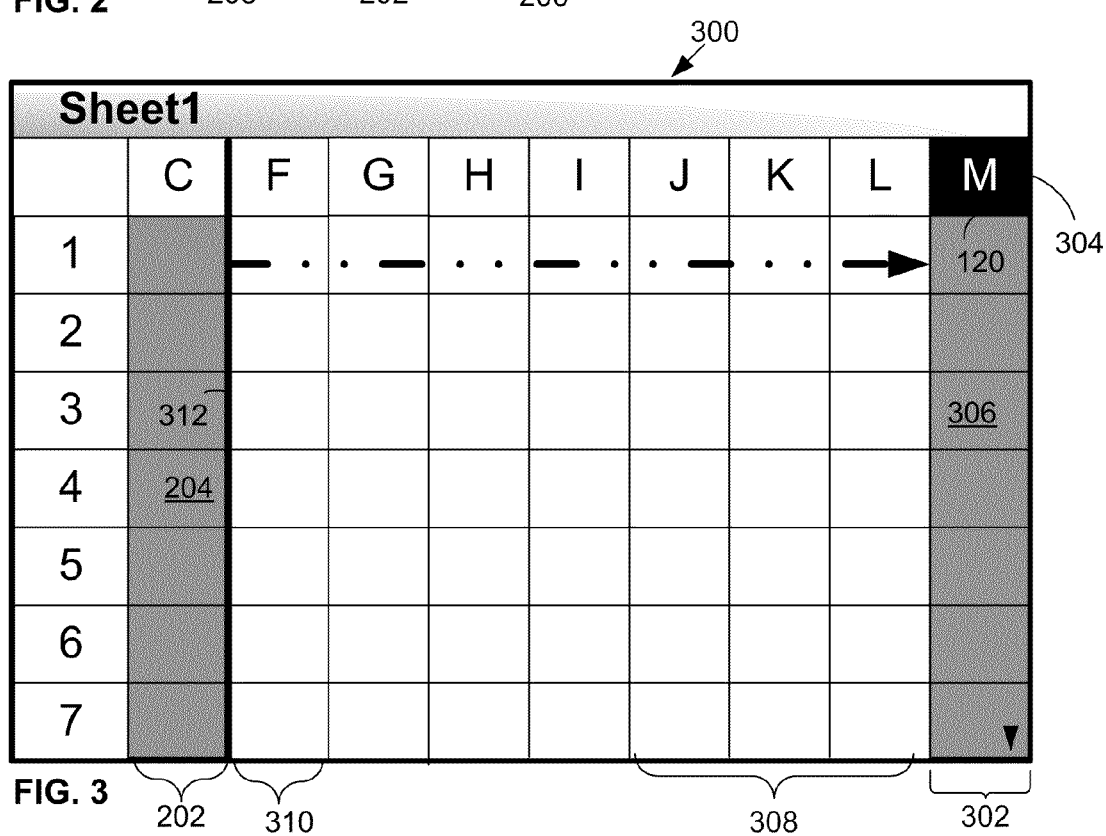

View 300 of FIG. 3 shows focus 120 moved to column M 302 at reference 304 to freeze this column. Background 306 is shaded to visually indicate this status. It will be recognized that as focus 120 was moved to column M 302, columns J, K and L (collectively 308) and M 302 were brought into display on window 106. Column C 202 moved horizontally leftward toward and adjacent to row references 116 displacing columns A and B (208) but column C 202 remains displayed in the window 106. To accommodate the freezing of column C 202, columns D and E, (collectively 206, FIG. 2) were displaced such that column F 310 is adjacent to column C 202 in window 106. Similar operations will be applicable for scrolling horizontally leftward (not shown). Thus as a user scrolls horizontally between two frozen columns (e.g. C 202 and M 302) only the columns therebetween (e.g. D to L) scroll in window 106.

To denote when there are additional columns available for display between a frozen column and an adjacent column that is displayed, the border between the columns (typically of the frozen column) may be bolded or otherwise highlighted. In FIG. 3 right border 312 of column C 202 is bolded to indicate neighbouring columns are not displayed but may be shown if the user scrolls leftward, moving the focus 120 to the left of column F 310 (FIG. 4) to have displayed column E (as shown in FIG. 4) and D (not shown) respectively.

Figure 4:
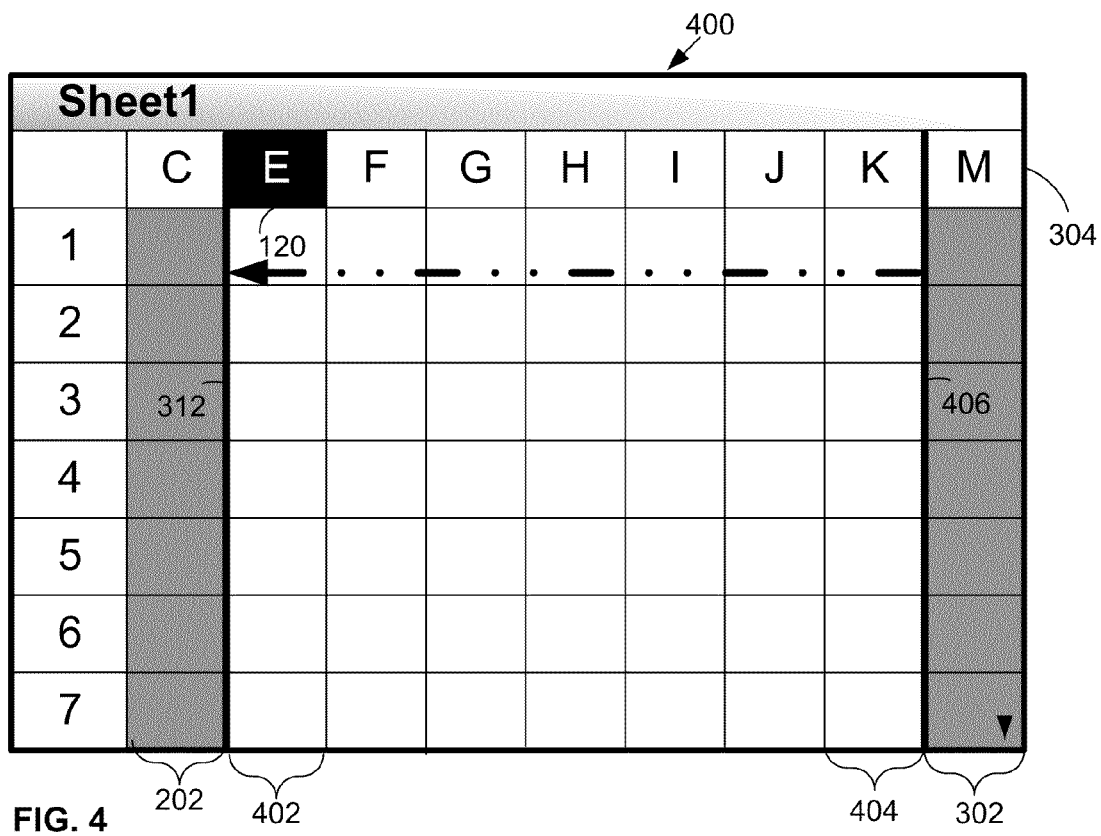
Figure 5:
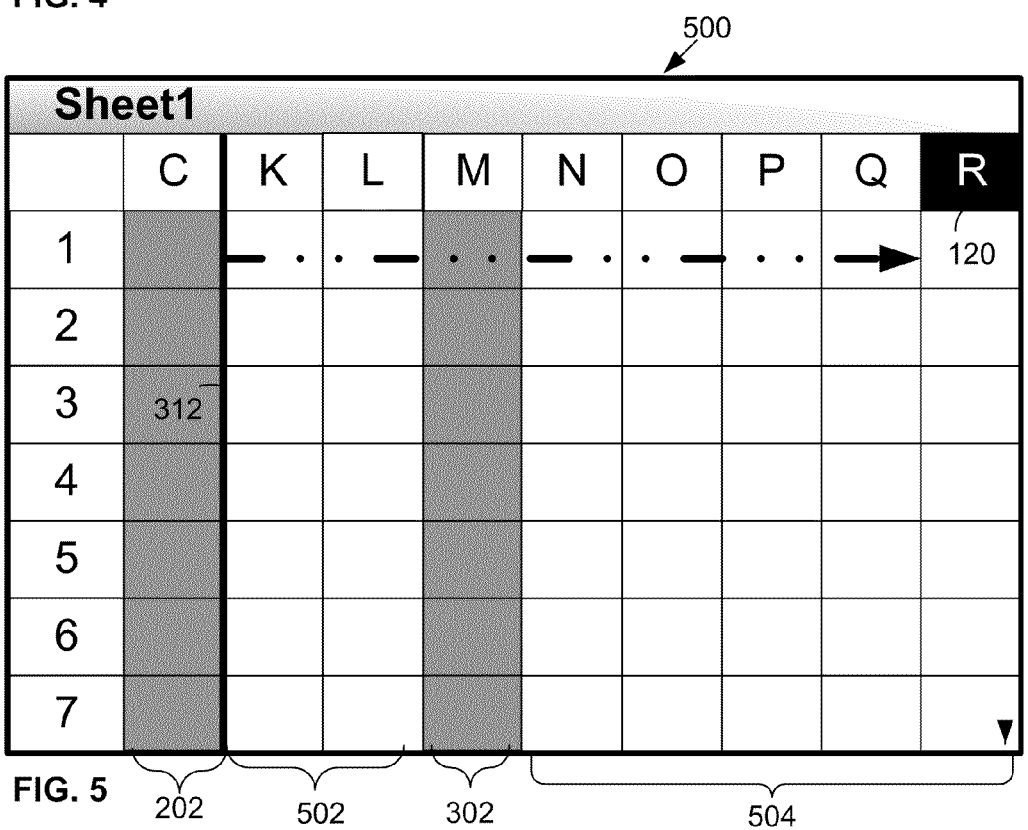

View 400 of FIG. 4 illustrates scrolling between the frozen columns 202 and 302. When focus 120 is moved to the column adjacent frozen column C 202 and advanced further left, the columns between the two frozen columns scroll rightward, adding a new column to the right 402 of column C and removing a column to the left 404 of column M. Left border 406 of column M is bolded to show the availability of the displaced column.

Should a user scroll outside the set of columns bounded by the two frozen columns C 202 and M 302, for example, scrolling focus 120 horizontally to the right beyond column M 302, column M 302 is moved horizontally leftward toward frozen column C 202, adding new columns 504 to the right of column M. Columns 502 between the frozen columns C and M may be displaced (typically those to the right of column C, the leftmost frozen column) to accommodate the new columns 504 inserted to the left of the rightmost frozen columns.

Though only two frozen columns are shown, operations may be adapted for additional frozen columns. Should a sufficient number of columns be frozen so that there is no unallocated space in window 106, a user may not be able to scroll to display other columns and may be required to turn off freezing on one or more columns to permit additional scrolling. It is also understood, that using the teachings herein adjacent columns may be frozen though only non-adjacent columns are shown frozen in the representative views of FIGS. 1-5. Though columns of equal width are illustrated, displays of different width columns may also be accommodated. For example, should a column be too wide to fit on the display, a part of the column may be displayed.

Though the embodiment of FIGS. 1-5 is illustrated with reference to columns and in particular non-adjacent columns, it will be understood that rows may be similarly frozen for continuous display when moving vertically in the table UI.

Figure 11A:
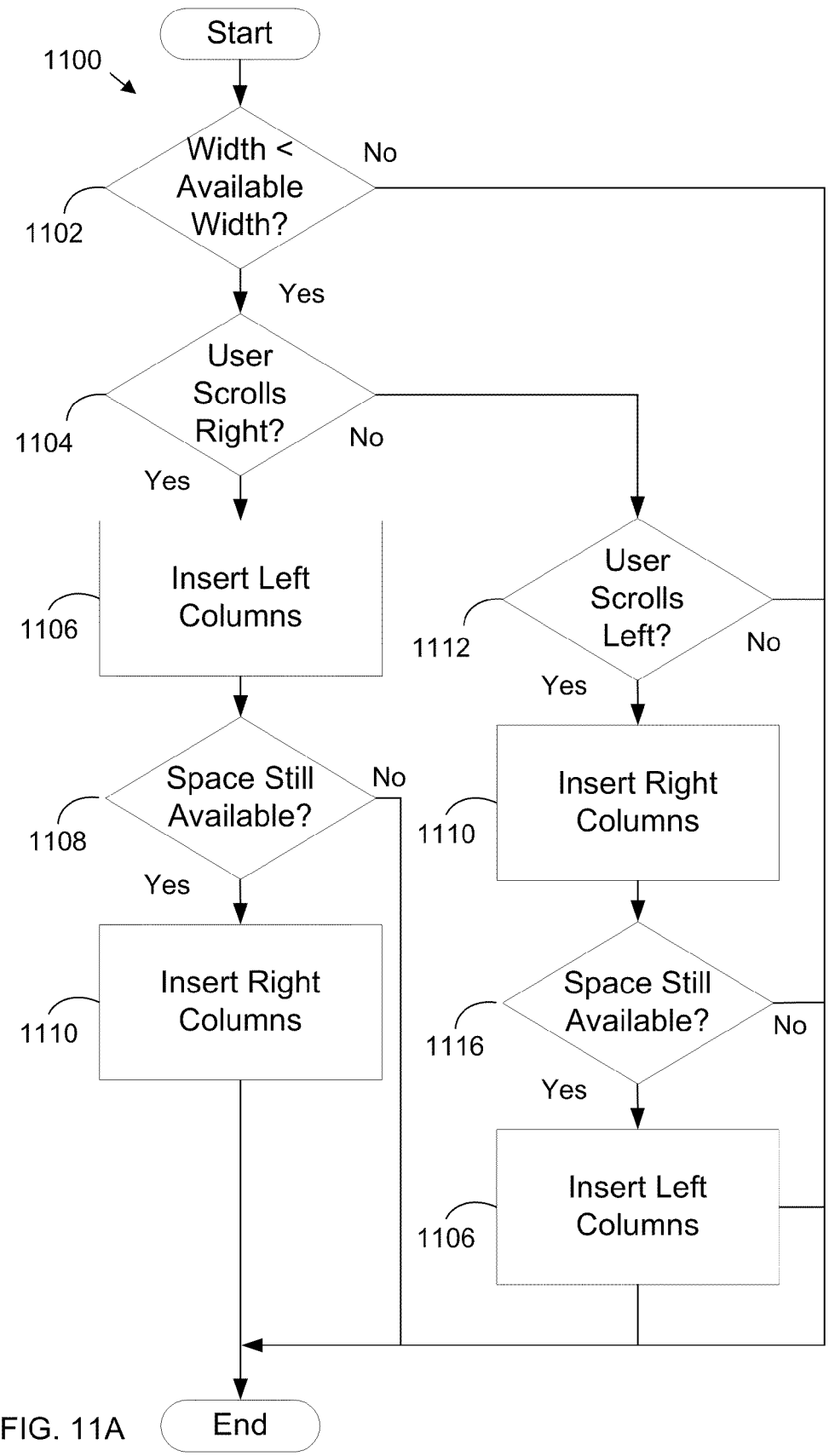
FIGS. 11A-11C are flowcharts of operations for freezing non-adjacent columns.
Figure 11B:
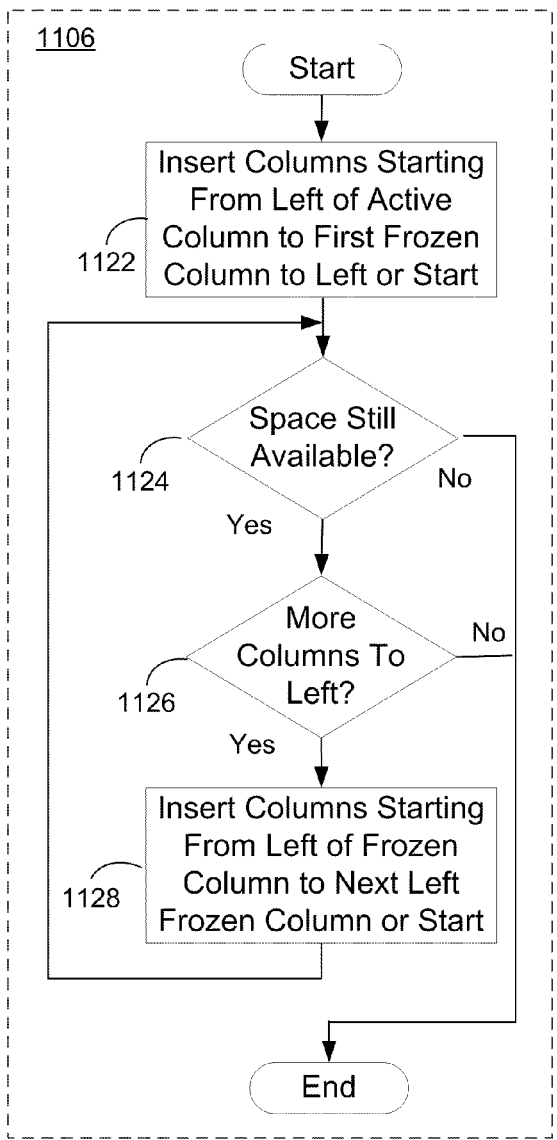
Figure 11C:
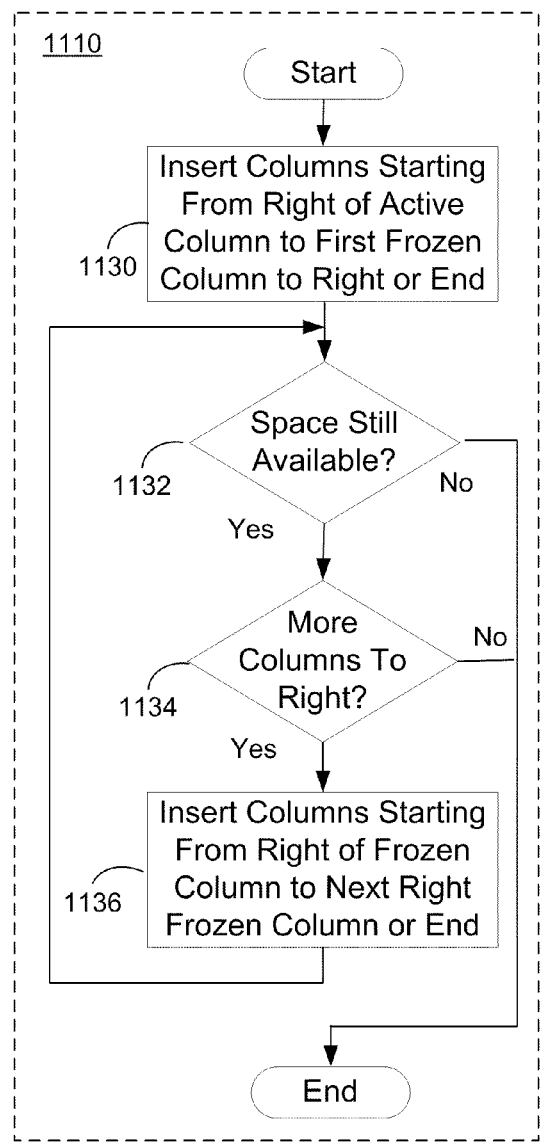

Thus a table UI control that permits a user to freeze selected columns (rows), even if such are not adjacent to one another in the table, allows a user to better relate information between the columns (rows) particularly when the columns (rows) would not otherwise be visible on the screen simultaneously. In accordance with an embodiment, FIGS. 11A-11C illustrate operations of a table UI control to freeze selected columns. Intervening columns between two frozen non-adjacent columns may be scrolled to bring these columns into display as may be applicable. Amendments to these operations to accommodate freezing rows and moving vertically will be apparent to those of ordinary skill in the art. Operations may be configured as software (computer readable code including instructions and data for configuring the execution of a processor) for a UI component of a computer system to display tabular information.

In the operations 1100, certain information is referenced wherein:

| | |
|---|---|
| available width | width of the device screen available for displaying (sometimes called painting) the table; |
| active column | current column having the focus; |
| frozen columns | columns that are frozen and required to be painted on the screen regardless of which column has focus; |
| width | total width of active column and frozen columns |

Operations 1100 determine the columns to be painted in addition to the frozen columns and the active column when a user scrolls left or right to a column not shown on the screen. Once the columns are determined, painting may follow (not shown).

With reference to FIG. 11A, at step 1102, a determination is made whether "width<available width" such that if it is true, there is space to show other columns that are not frozen. If not true, operations 1100 end and no additional columns may be painted. At step 1104, a determination is made whether the user has scrolled to the right. If yes, then at step 1106 operations "insert left columns" (See FIG. 11B) is performed. If more space is available (step 1108) then at step 1110 operations "insert right columns" (See FIG. 11C) is performed.

At step 1104, a not true determination branches to step 112 where a confirmation that the user scrolled to the left is made. If so, "insert right columns" (step 1110) is performed followed by "insert left columns" (step 1106) if there is space still available (step 1116).

Operations 1106 (FIG. 11B) to insert left columns may proceed as follows: columns are inserted to the left of the active column back toward the first frozen column to the left, if any such a frozen column exists. If there is more space available to add columns (e.g. "width plus added columns<available width") (step 1124) and if there are more columns to the left to add (step 1126), then the columns are inserted from the left toward the next left frozen column or the start of the table (step 1128). Operations may loop to step 1124 for further inserting to the left of any other frozen columns.

Operations 1110 (FIG. 11C) to insert right columns comprising steps 1130, 1132, 1134 and 1136 proceed in a mirror fashion to operations 1106.

Some table UI controls permit hiding columns. The above operations may be adapted to insert only those columns that are not hidden.

FIGS. 6-10 illustrate representative views of a UI for displaying tabular information on a display screen of a computing device. In this embodiment, the UI freezes the title or header row for display when a user navigates (e.g. scrolls vertically) about the table.

View 600 shows a display window including a portion 601 in which content may be displayed for viewing by a user and about which a user may scroll or otherwise navigate to bring content into the display portion 601. Portion 601 is bounded by a top border 602 and a bottom border 604. Moving a focus (e.g. 120) vertically about the document scrolls the document up or down relative to the screen. Portions of the document below the bottom border 604 are brought in for display when a scrolls (navigates) downwardly at bottom border 604. Similarly portions above top border 602 are added when navigating upwardly.

In the example shown in this embodiment, the view 600 is generated by a UI of a browser application to display a document such as a web page including tabular information. Other UIs will be applicable (e.g. a UI display for a word processing document including a table).

Figure 6:
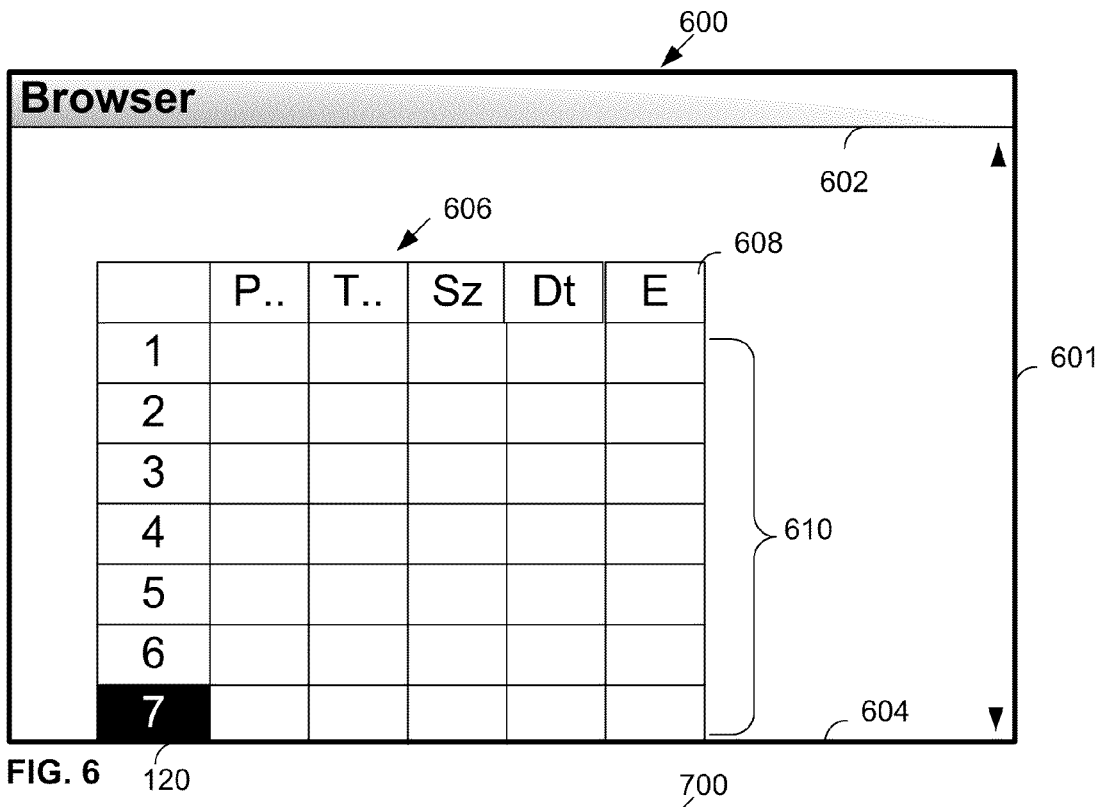
FIGS. 6-10 illustrate views of a user interface for displaying information in tabular form configured for freezing a header/title row in a table in accordance with an embodiment.
Figure 7:
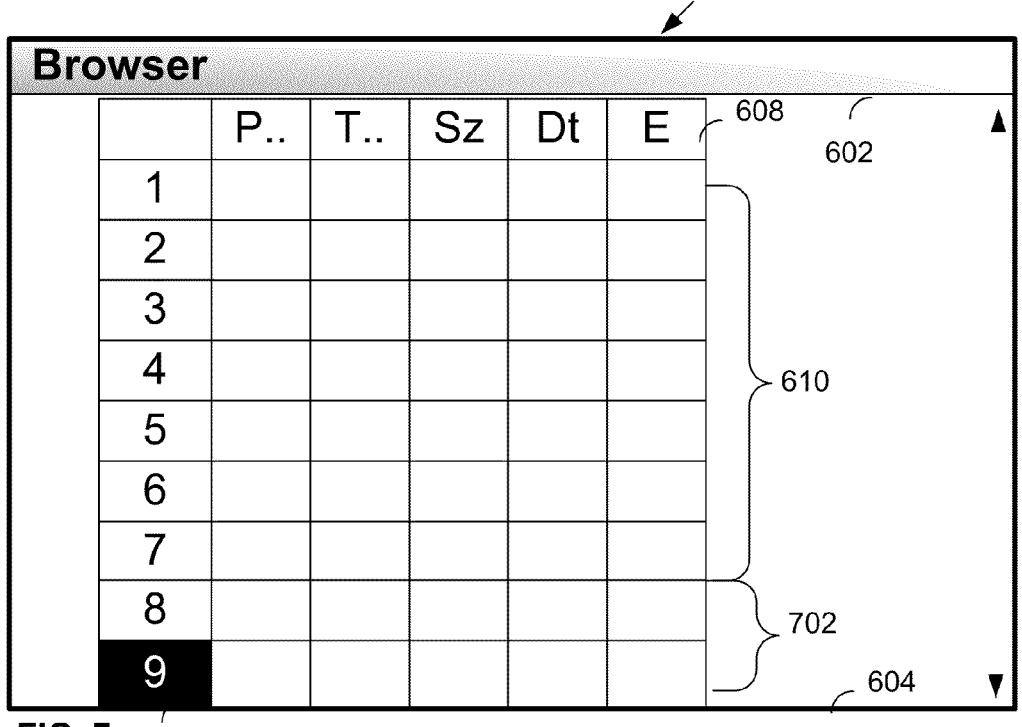
Figure 8:
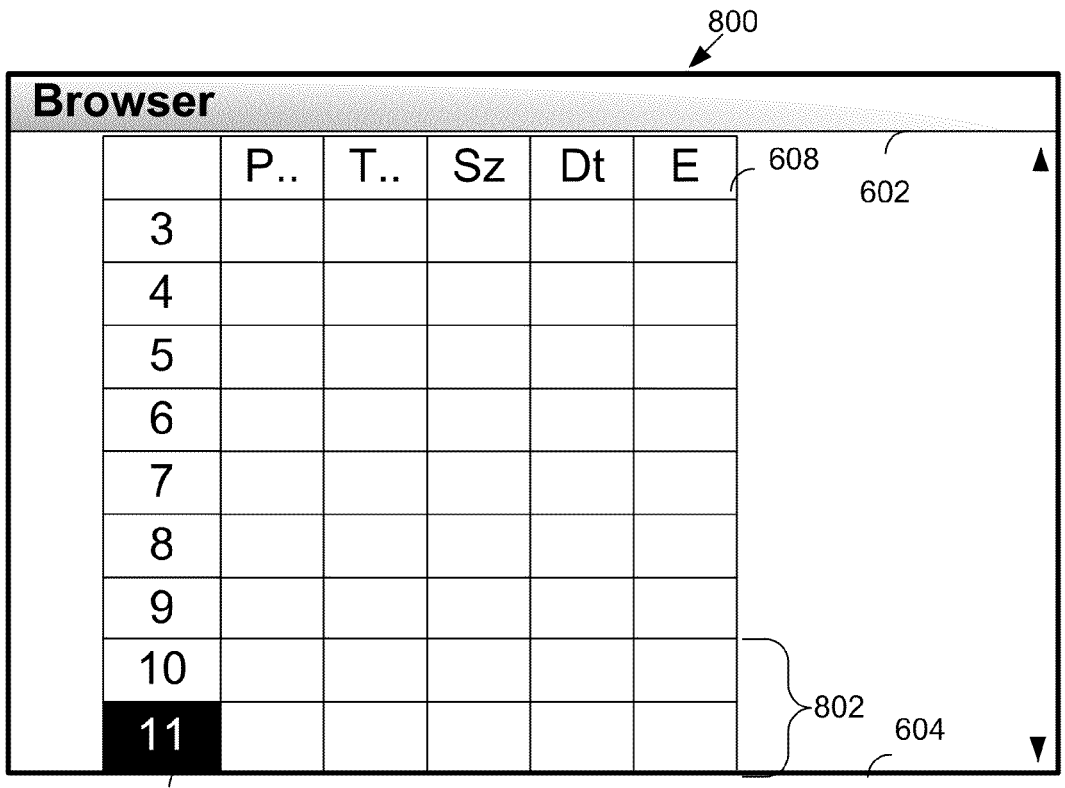

FIG. 6 shows a view 600 of a document including a table 606 having a header row 608 and plurality of rows (e.g. 610) of information. As focus 120 is moved down the rows of the table, (see view 700, FIG. 7) additional table rows 702 are added to the display and table 606 appears to scroll up the display portion 601 until the header row 608 reaches the top border 602. Header 608 is frozen so that as the focus 120 is moved further down table 606, subsequent rows 802 are displayed (see view 800, FIG. 8). Header row 608 remains displayed while topmost upper rows of the table are displaced from the display portion 601.

Figure 9:
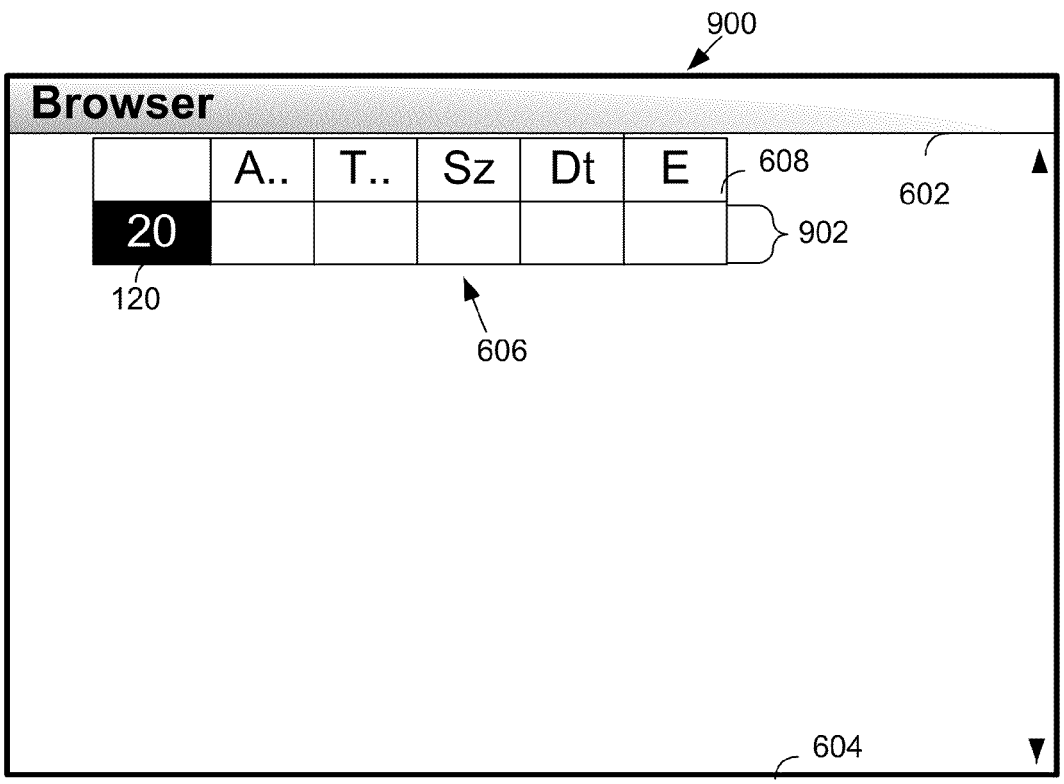
Figure 10:
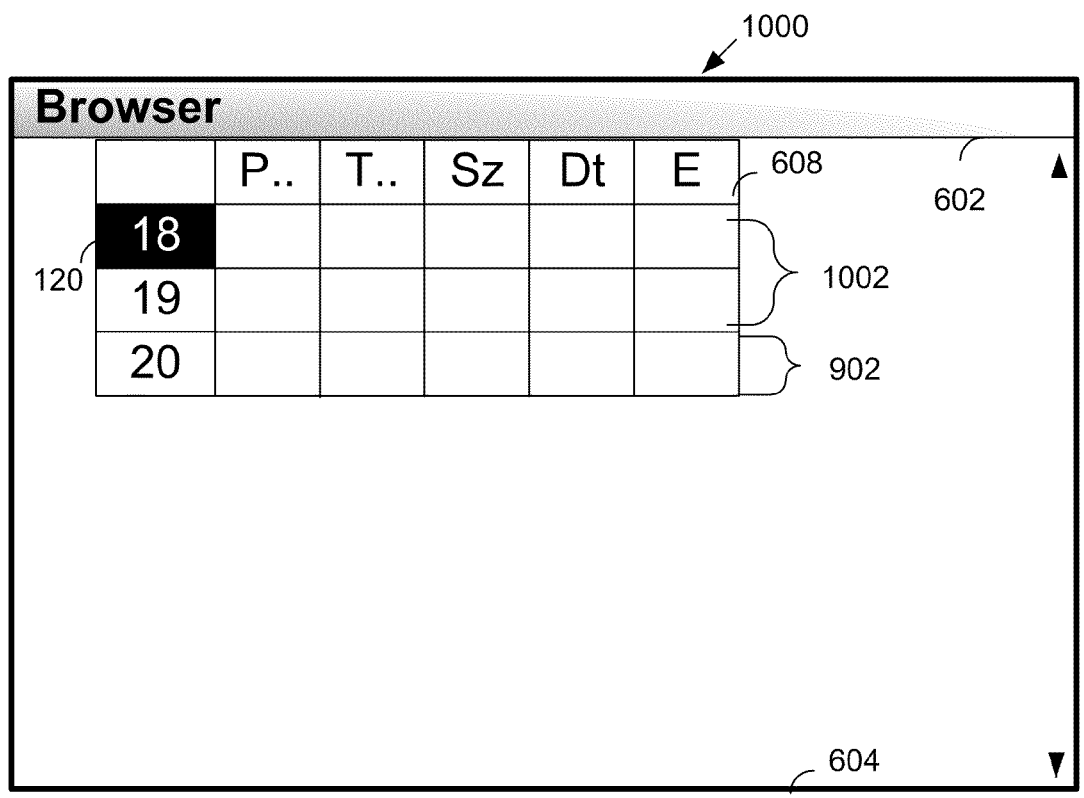

FIG. 9 illustrates navigation in the document to table 606 from below the table 606. As the bottom row 902 of the table is reached by focus 120, the bottom row 902 of table 606 is displayed with header 608 at the top in view 900. As shown in view 1000 of FIG. 10, as focus 120 is moved up table 606, rows (e.g. 1002) are inserted below frozen header 608.

Though the embodiment of FIGS. 6-10 is illustrated with reference to a header row, it will be understood that the other border row (i.e. a footer row) at the bottom of the table may be similarly frozen (alone or together with the header row) when moving vertically or left and/or rightmost border columns may be frozen when moving horizontally.

Using a table UI with a frozen border feature addresses issues of not being able to relate information in the table. Information may be related better by showing the titles/descriptions for columns as found in the header row (or other border) at all times that the table is displayed. The table UI can be used with other UI controls in focus based scrolling where a focus moves to a UI control above or below an area of the document being displayed to scroll the screen as noted. Typically in such scrolling, the UI maintains information about the size and relative position of the UI fields from the top of the screen. A table UI maintains information about row height (column width) and how may rows (columns) can be displayed on the screen. With this information, a table UI can predict a vertical (horizontal) scroll position when the user moves the focus up or down (left or right). It can be predicted whether a particular row (column) is currently visible on a screen.

Figure 12A:
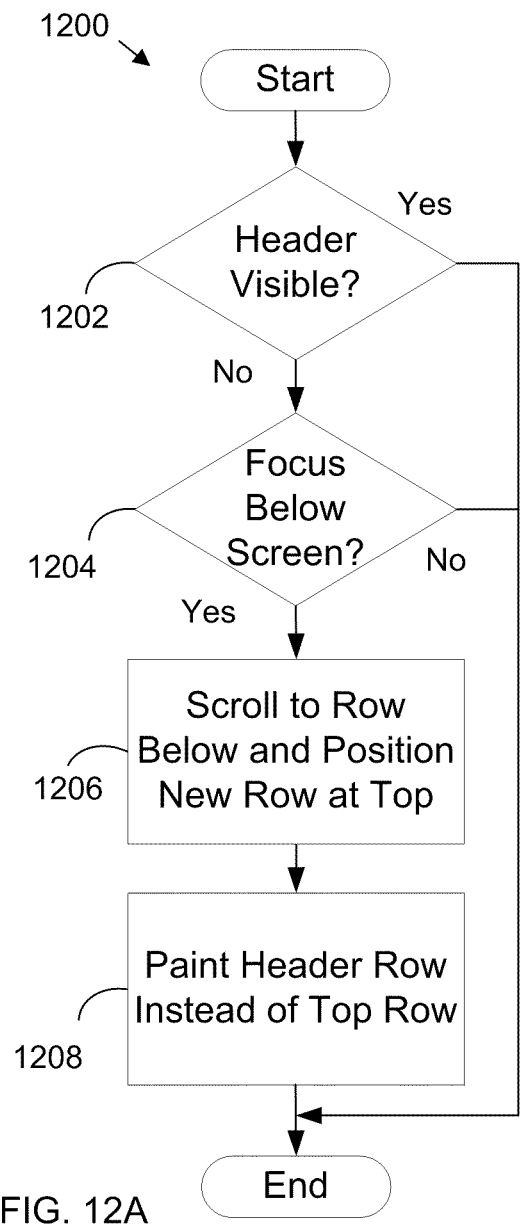
FIGS. 12A-12B are flowcharts of operations for freezing a heading row when a table user interface control is invoked.

Thus, in accordance with an embodiment, FIG. 12A illustrates operations 1200 of a table UI control to display (sometimes called "paint" in the art) the header row in the table when it would not otherwise be presented. The frozen header feature may be invoked whenever the table US gains focus when scrolling in the document.

At step 1202, a determination is made whether the header row is not visible. If it is, operations to display applicable rows continue as per routine (not shown). If it is not and, as per step 1204, the focus is moved below the screen, step 1206 operations scroll the screen down so that the row below the screen (presently not visible) moves up and the a new top row is positioned with the top edge of the screen. At step 1208, when painting table, paint header row instead of new top row.

Figure 12B:
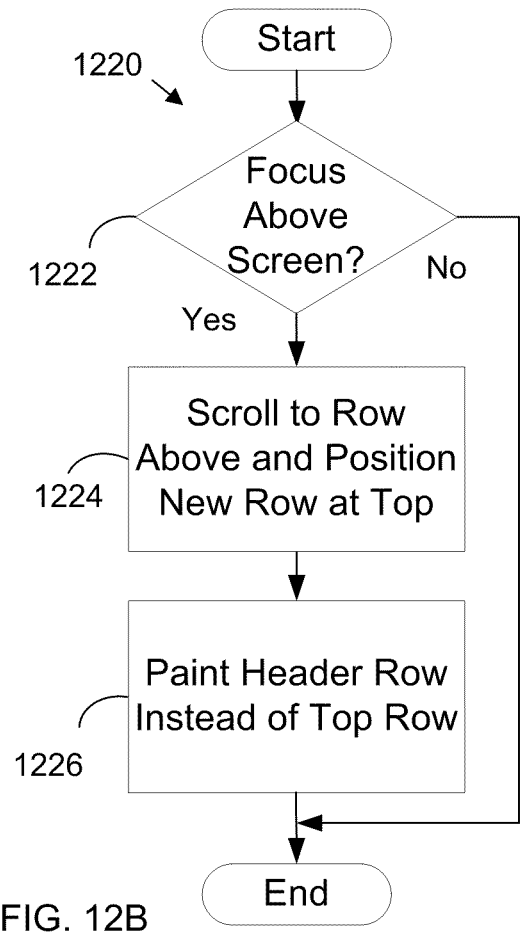

Similar operations 1220 may be employed for a screen focus move to a row above the current screen. As shown in FIG. 12B, at step 1222 a determination is made whether the focus moves above the screen. If so operations at step 1224 scroll to the row above the screen that is not visible, appearing to move the row down the screen and a new top row is aligned with the top of the screen and the table. At step 1226, when painting the table, paint header row instead of top row.

Operations to freeze non-adjacent columns (rows) and border rows (columns) may be performed in combination, if desired, when painting a table. A representative computing device with a relatively small display screen is described further below as a candidate device for presenting tabular information as described with reference to FIGS. 1-12B.

FIG. 13 is a block diagram of a communication system 1300 which includes a wireless communication device 1302 which communicates through a wireless communication network 1304. Wireless communication device 1302 preferably includes a visual display 1312, a keyboard 1314, and perhaps one or more auxiliary user interfaces (UI) 1316, each of which is coupled to a controller 1306. Controller 1306 is also coupled to radio frequency (RF) transceiver circuitry 1308 and an antenna 1310.

Typically, controller 1306 is embodied as a central processing unit (CPU) which runs operating system software in a memory component (not shown). Controller 1306 will normally control overall operation of wireless communication device 1302, whereas signal processing operations associated with communication functions are typically performed in RF transceiver circuitry 1308. Controller 1306 interfaces with device display 1312 to display received information, stored information, user inputs, and the like. Keyboard 114, which may be a telephone type keypad or full alphanumeric keyboard, is normally provided for entering data for storage in wireless communication device 1302, information for transmission to network 1304, a telephone number to place a telephone call, commands to be executed on wireless communication device 1302, and possibly other or different user inputs.

Wireless communication device 1302 sends communication signals to and receives communication signals from network 1304 over a wireless link via antenna 1310. RF transceiver circuitry 1308 performs functions similar to those of a radio network (RN) 1328, including for example modulation/demodulation and possibly encoding/decoding and encryption/decryption. It is also contemplated that RF transceiver circuitry 1308 may perform certain functions in addition to those performed by RN 1328. It will be apparent to those skilled in art that RF transceiver circuitry 1308 will be adapted to particular wireless network or networks in which wireless communication device 1302 is intended to operate.

Wireless communication device 1302 includes a battery interface 1322 for receiving one or more rechargeable batteries 1324. Battery 1324 provides electrical power to electrical circuitry in wireless communication device 1302, and battery interface 1322 provides for a mechanical and electrical connection for battery 1324. Battery interface 1322 is coupled to a regulator 1326 which regulates power to the device. When wireless communication device 1302 is fully operational, an RF transmitter of RF transceiver circuitry 1308 is typically turned on only when it is sending to network, and is otherwise turned off to conserve resources. Similarly, an RF receiver of RF transceiver circuitry 1308 is typically periodically turned off to conserve power until it is needed to receive signals or information (if at all) during designated time periods.

Wireless communication device 1302 operates using a memory module 1320, such as a Subscriber Identity Module (SIM) or a Removable User Identity Module (R-UIM), which is connected to or inserted in wireless communication device 1302 at an interface 1318. As an alternative to a SIM or an R-UIM, wireless communication device 1302 may operate based on configuration data programmed by a service provider into an internal memory which is a non-volatile memory. Wireless communication device 1302 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, wireless communication device 1302 may be a multiple-module unit comprising a plurality of separate components, including but in no way limited to a computer or other device connected to a wireless modem. In particular, for example, in the wireless communication device block diagram of FIG. 13, RF transceiver circuitry 1308 and antenna 1310 may be implemented as a radio modem unit that may be inserted into a port on a laptop computer. In this case, the laptop computer would include display 1312, keyboard 1314, and one or more auxiliary UIs 1316, and controller 1306 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 1308 and antenna 1310 of a single-unit device such as one of those described above. Such a wireless communication device 1302 may have a more particular implementation as described later in relation to wireless communication device 1402 of FIG. 14.

Wireless communication device 1302 communicates in and through wireless communication network 1304. In the embodiment of FIG. 13, wireless network 1304 is a Third Generation (3G) supported network based on Code Division Multiple Access (CDMA) technologies. In particular, wireless network 1304 is a CDMA2000 network which includes fixed network components coupled as shown in FIG. 13. Wireless network 1304 of the CDMA2000-type includes a Radio Network (RN) 1328, a Mobile Switching Center (MSC) 1330, a Signaling System 7 (SS7) network 1340, a Home Location Register/Authentication Center (HLR/AC) 1338, a Packet Data Serving Node (PDSN) 1332, an IP network 1334, and a Remote Authentication Dial-In User Service (RADIUS) server 1336. SS7 network 1340 is communicatively coupled to a network 1342 (such as a Public Switched Telephone Network or PSTN), whereas IP network is communicatively coupled to a network 1344 (such as the Internet). Persons of ordinary skill in the art will appreciate that other networks and associated topologies including GPRS, E-GPRS and UMTS radio networks, among many others, may be employed with the teachings herein.

During operation, wireless communication device 1302 communicates with RN 1328 which performs functions such as call-setup, call processing, and mobility management. RN 1328 includes a plurality of base station transceiver systems that provide wireless network coverage for a particular coverage area commonly referred to as a "cell". A given base station transceiver system of RN 1328, such as the one shown in FIG. 13, transmits communication signals to and receives communication signals from wireless communication devices within its cell. The base station transceiver system normally performs such functions as modulation and possibly encoding and/or encryption of signals to be transmitted to the wireless communication device in accordance with particular, usually predetermined, communication protocols and parameters, under control of its controller. The base station transceiver system similarly demodulates and possibly decodes and decrypts, if necessary, any communication signals received from wireless communication device 1302 within its cell. Communication protocols and parameters may vary between different networks. For example, one network may employ a different modulation scheme and operate at different frequencies than other networks. The underlying services may also differ based on its particular protocol revision.

The wireless link shown in communication system 1300 of FIG. 13 represents one or more different channels, typically different radio frequency (RF) channels, and associated protocols used between wireless network 13304 and wireless communication device 1302. An RF channel is a limited resource that must be conserved, typically due to limits in overall bandwidth and a limited battery power of wireless communication device 1302. Those skilled in art will appreciate that a wireless network in actual practice may include hundreds of cells depending upon desired overall expanse of network coverage. All pertinent components may be connected by multiple switches and routers (not shown), controlled by multiple network controllers.

For all wireless communication devices 1302 registered with a network operator, permanent data (such as wireless communication device 1302 user's profile) as well as temporary data (such as wireless communication device's 1302 current location) are stored in a HLR/AC 1338. In case of a voice call to wireless communication device 1302, HLR/AC 1338 is queried to determine the current location of wireless communication device 1302. A Visitor Location Register (VLR) of MSC 1330 is responsible for a group of location areas and stores the data of those wireless communication devices that are currently in its area of responsibility. This includes parts of the permanent wireless communication device data that have been transmitted from HLR/AC 1338 to the VLR for faster access. However, the VLR of MSC 1330 may also assign and store local data, such as temporary identifications. Wireless communication device 1302 is also authenticated on system access by HLR/AC 1338. In order to provide packet data services to wireless communication device 1302 in a CDMA2000-based network, RN 128 communicates with PDSN 1332. PDSN 132 provides access to the Internet 1344 (or intranets, Wireless Application Protocol (WAP) servers, etc.) through IP network 1334. PDSN 1332 also provides foreign agent (FA) functionality in mobile IP networks as well as packet transport for virtual private networking. PDSN 1332 has a range of IP addresses and performs IP address management, session maintenance, and optional caching. RADIUS server 1336 is responsible for performing functions related to authentication, authorization, and accounting (AAA) of packet data services, and may be referred to as an AAA server.

Wireless communication network 1304 also includes a Push-to-talk over Cellular (PoC) server 1337 which may be coupled to IP network 1334. PoC server 1337 operates to facilitate PoC individual and group communication sessions between wireless communication devices within network 1304. A conventional PoC communication session involves a session connection between end users of wireless communication devices, referred to as session "participants", who communicate one at a time in a half-duplex manner much like conventional walkie-talkies or two-way radios.

Those skilled in art will appreciate that wireless network 1304 may be connected to other systems, possibly including other networks, not explicitly shown in FIG. 13. A network will normally be transmitting at very least some sort of paging and system information on an ongoing basis, even if there is no actual packet data exchanged. Although the network consists of many parts, these parts all work together to result in certain behaviours at the wireless link.

Figure 14:
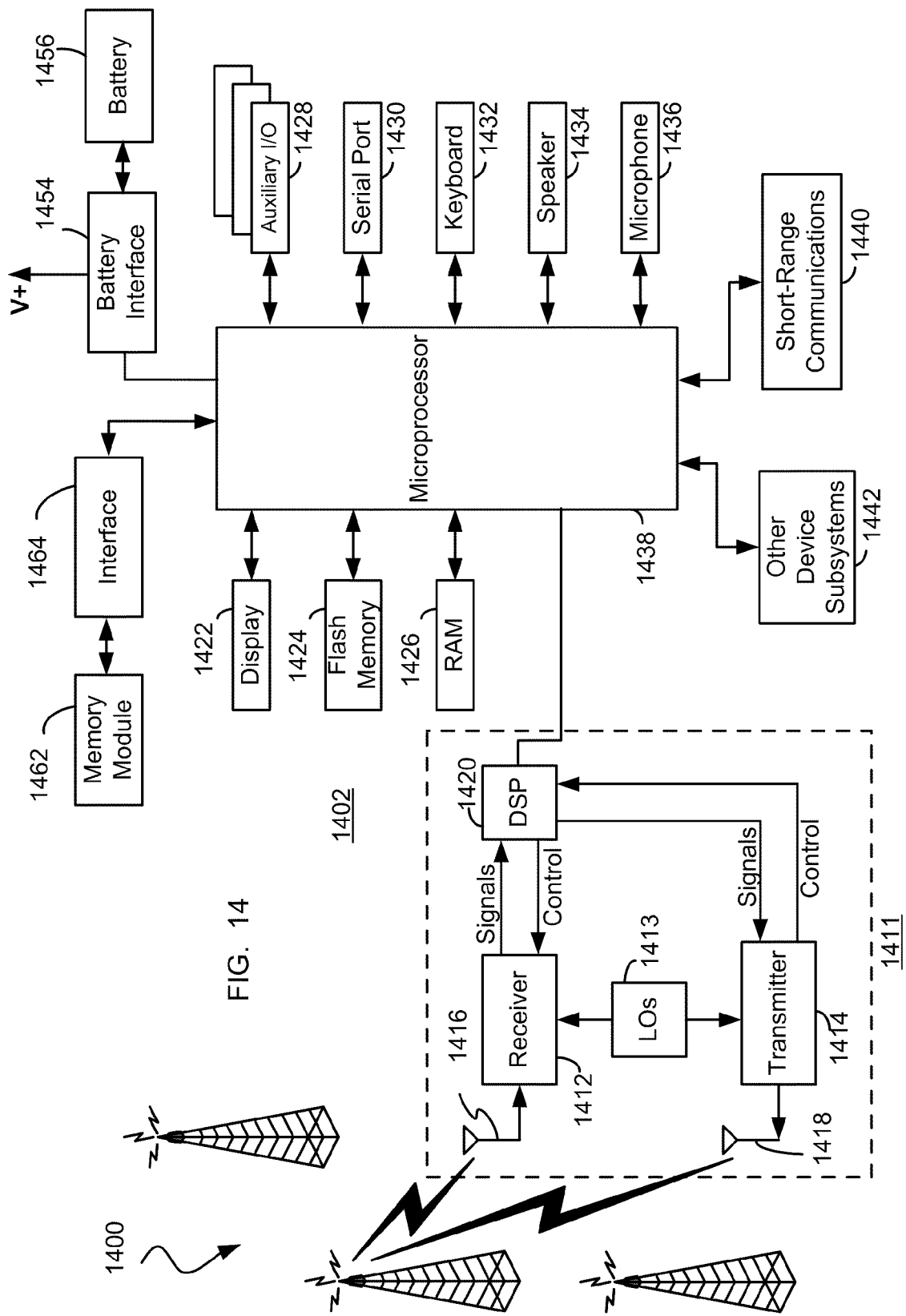
FIG. 14 is a more detailed diagram of the computing device of FIG. 13.

FIG. 14 is a detailed block diagram of a preferred wireless communication device 1402. Wireless communication device 1402 is preferably a two-way communication device having at least voice and advanced data communication capabilities, including the capability to communicate with other computer systems. Depending on the functionality provided by wireless communication device 1402, it may be referred to as a data messaging device, a two-way pager, a cellular telephone with data messaging capabilities, a wireless Internet appliance, or a data communication device (with or without telephony capabilities). Wireless communication device 1402 may communicate with any one of a plurality of base station transceiver systems 1400 within its geographic coverage area.

Wireless communication device 1402 will normally incorporate a communication subsystem 1411, which includes a receiver 1412, a transmitter 1414, and associated components, such as one or more (preferably embedded or internal) antenna elements 1416 and 1418, local oscillators (LOs) 1413, and a processing module such as a digital signal processor (DSP) 1420. Communication subsystem 1411 is analogous to RF transceiver circuitry 1308 and antenna 1310 shown in FIG. 13. As will be apparent to those skilled in field of communications, particular design of communication subsystem 1411 depends on the communication network in which wireless communication device 1402 is intended to operate.

Wireless communication device 1402 may send and receive communication signals over the network after required network registration or activation procedures have been completed. Signals received by antenna 1416 through the network are input to receiver 1412, which may perform such common receiver functions as signal amplification, frequency down conversion, filtering, channel selection, and like, and in example shown in FIG. 14, analog-to-digital (ND) conversion. ND conversion of a received signal allows more complex communication functions such as demodulation and decoding to be performed in DSP 1420. In a similar manner, signals to be transmitted are processed, including modulation and encoding, for example, by DSP 1420. These DSP-processed signals are input to transmitter 1414 for digital-to-analog (D/A) conversion, frequency up conversion, filtering, amplification and transmission over communication network via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

Network access is associated with a subscriber or user of wireless communication device 1402, and therefore wireless communication device 1402 requires a memory module 1462, such as a Subscriber Identity Module or "SIM" card or a Removable User Identity Module (R-UIM), to be inserted in or connected to an interface 1464 of wireless communication device 1402 in order to operate in the network. Alternatively, memory module 1462 may be a non-volatile memory which is programmed with configuration data by a service provider so that wireless communication device 1402 may operate in the network. Since wireless communication device 1402 is a mobile battery-powered device, it also includes a battery interface 1454 for receiving one or more rechargeable batteries 1456. Such a battery 1456 provides electrical power to most if not all electrical circuitry in wireless communication device 1402, and battery interface 1454 provides for a mechanical and electrical connection for it. The battery interface 1454 is coupled to a regulator (not shown in FIG. 14) which provides power V+ to all of the circuitry.

Wireless communication device 1402 includes a microprocessor 1438 (which is one implementation of controller 1306 of FIG. 13) which controls overall operation of wireless communication device 1402. This control includes network selection techniques of the present application. Communication functions, including at least data and voice communications, are performed through communication subsystem 1411. Microprocessor 1438 also interacts with additional device subsystems such as a display 1422, a flash memory 1424, a random access memory (RAM) 1426, auxiliary input/output (I/O) subsystems 1428, a serial port 1430, a keyboard 1432, a speaker 1434, a microphone 1436, a short-range communications subsystem 1440, and any other device subsystems generally designated at 1442. Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list. Operating system software used by microprocessor 1438 is preferably stored in a persistent store such as flash memory 1424, which may alternatively be a read-only memory (ROM) or similar storage element (not shown). Those skilled in the art will appreciate that the operating system, specific device applications, or parts thereof, may be temporarily loaded into a volatile store such as RAM 1426.

Microprocessor 1438, in addition to its operating system functions, preferably enables execution of software applications on wireless communication device 1402. A predetermined set of applications which control basic device operations, including at least data and voice communication applications, will normally be installed on wireless communication device 1402 during its manufacture. A preferred application that may be loaded onto wireless communication device 1402 may be a personal information manager (PIM) application having the ability to organize and manage data items relating to user such as, but not limited to, e-mail, calendar events, voice mails, appointments, and task items. Naturally, one or more memory stores are available on wireless communication device 1402 and SIM 1462 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless communication device user's corresponding data items stored and/or associated with a host computer system thereby creating a mirrored host computer on wireless communication device 1402 with respect to such items. This is especially advantageous where the host computer system is the wireless communication device user's office computer system. Additional applications may also be loaded onto wireless communication device 1402 through network, an auxiliary I/O subsystem 1428, serial port 1430, short-range communications subsystem 1440, or any other suitable subsystem 242, and installed by a user in RAM 1426 or preferably a non-volatile store (not shown) for execution by microprocessor 1438. Such flexibility in application installation increases the functionality of wireless communication device 1402 and may provide enhanced on-device functions, communication-related functions, or both. For example, secure communication applications may enable electronic commerce functions and other such financial transactions to be performed using wireless communication device 1402.

In a data communication mode, a received signal such as a text message, an e-mail message, or web page download will be processed by communication subsystem 1411 and input to microprocessor 1438. Microprocessor 1438 will preferably further process the signal for output to display 1422 or alternatively to auxiliary I/O device 1428. A user of wireless communication device 1402 may also compose data items, such as e-mail messages, for example, using keyboard 1432 in conjunction with display 1422 and possibly auxiliary I/O device 1428. Keyboard 1432 is preferably a complete alphanumeric keyboard and/or telephone-type keypad. These composed items may be transmitted over a communication network through communication subsystem 1411.

For voice communications, the overall operation of wireless communication device 1402 is substantially similar, except that the received signals would be output to speaker 1434 and signals for transmission would be generated by microphone 1436. Alternative voice or audio I/O subsystems, such as a voice message recording subsystem, may also be implemented on wireless communication device 1402. Although voice or audio signal output is preferably accomplished primarily through speaker 1434, display 1422 may also be used to provide an indication of the identity of a calling party, duration of a voice call, or other voice call related information, as some examples.

Serial port 1430 in FIG. 14 is normally implemented in a personal digital assistant (PDA)-type communication device for which synchronization with a user's desktop computer is a desirable, albeit optional, component. Serial port 1430 enables a user to set preferences through an external device or software application and extends the capabilities of wireless communication device 1402 by providing for information or software downloads to wireless communication device 1402 other than through a wireless communication network. The alternate download path may, for example, be used to load an encryption key onto wireless communication device 1402 through a direct and thus reliable and trusted connection to thereby provide secure device communication.

Short-range communications subsystem 1440 of FIG. 14 is an additional optional component which provides for communication between wireless communication device 1402 and different systems or devices, which need not necessarily be similar devices. For example, subsystem 1440 may include an infrared device and associated circuits and components, or a Bluetooth™ communication module to provide for communication with similarly-enabled systems and devices. Bluetooth™ is a registered trademark of Bluetooth SIG, Inc.

Device 1402 may be adapted to incorporate table UI controls described with reference to FIGS. 1-12B. For example, a spreadsheet application for displaying spreadsheet documents may be adapted to freeze selected columns. In a further example, a document browsing application may be adapted with a table UI control to freeze a table's header row.

The invention claimed is:

1. A method of displaying tabular information in a graphical user interface (GUI) on a display screen, said method comprising:
    freezing the display of a first column or a first row of a table displayed in the GUI;
    scrolling the table to bring at least one other column or at least one other row into the GUI for display;
    freezing the display of a second column from said at least one other column or a second row from said at least one other row; and
    scrolling between the two frozen columns or the two frozen rows in the same GUI, whereby the respective columns or rows therebetween scroll in the table.

2. The method of claim 1 further comprising scrolling outside the columns or rows bounded by the two frozen columns or two frozen rows to bring at least one additional column or at least one additional row available for display into the GUI, such that one of the two frozen columns moves towards the other of the two frozen columns or one of the two frozen rows moves towards the other one of the two frozen rows to displace at least some of the respective columns or rows therebetween to accommodate the at least one additional column or at least one additional row.

3. The method of claim 1 further comprising:
    providing an option to freeze the display of selected columns including non-adjacent columns or selected rows including non-adjacent rows; and
    receiving first input selecting at least one row or column for freezing.

4. The method of claim 3 further comprising:
receiving second input to move the focus to scroll the display of the table; and ensuring the display of the selected at least one row or column when scrolling the display of the table.

5. The method of claim 1 comprising freezing a border row or border column of the table when scrolling the display of the table.

6. The method of claim 5 wherein the table comprises a portion of a document being displayed on the display screen, which document is navigable by moving a focus to scroll the document; and wherein the display of the table is invoked when scrolling to bring a UI control for the table onto the display screen.

7. The method of claim 6 comprising, receiving first input scrolling the UI control on to the display at an edge of the display screen, aligning a respective edge portion of the table to be scrolled onto the display with the edge of the display screen and displaying the border row or border column.

8. A system for displaying tabular information in a graphical user interface (GUI) on a display screen, said system comprising:
a display screen; and
a processor and a memory coupled thereto, said memory storing instructions and data for configuring the execution of the processor to:
freeze the display of a first column or a first row of a table displayed in the GUI;
scroll the table to bring at least one other column or at least one other row into the GUI for display;
freeze the display of a second column from said at least one other column or a second row from said at least one other row; and
scroll between the two frozen columns or the two frozen rows in the GUI, whereby the respective columns or rows therebetween scroll in the table.

9. The system of claim 8, wherein the instructions and data configure the execution of the processor to: scroll outside the columns or rows bounded by the two frozen columns or two frozen rows to bring at least one additional column or at least one additional row available for display into the GUI, such that one of the two frozen columns moves towards the other of the two frozen columns or one of the two frozen rows moves towards the other one of the two frozen rows to displace at least some of the respective columns or rows therebetween to accommodate the at least one additional column or at least one additional row.

10. The system of claim 9 further comprising one or more input devices for receiving input and wherein the instructions and data configure the execution of the processor to: provide an option to freeze the display of selected columns including non-adjacent columns or selected rows including non-adjacent rows; and receive first input selecting at least one row or column for freezing.

11. The system of claim 10 wherein the instructions and data configure the execution of the processor to:
receive second input to scroll the display of the table; and
ensure the display of the selected at least one row or column when scrolling the display of the table.

12. The system of claim 11 wherein the instructions and data configure the execution of the processor to: determine additional columns or rows to display with the columns or rows selected for freezing; and display the additional columns or rows and the columns or rows selected for freezing.

13. The system of claim 8 wherein the instructions and data configure the execution of the processor to freeze a border row or border column of the table when scrolling the display of the table.

14. The system of claim 13 wherein the instructions and data configure the execution of the processor to provide a UI control for displaying a table as a portion of a document being displayed on the display screen, said document navigable by moving a focus to scroll the document; and wherein the display of the table is invoked by scrolling to bring the UI control onto the display screen.

15. The system of claim 14 wherein the instructions and data configure the execution of the processor to: receive user input scrolling the UI control on to the display at an edge of the display screen, aligning a respective edge portion of the table to be scrolled onto the display with the edge of the display screen; and display the border row or border column.

16. A computer program product comprising a memory storing computer readable code embodied therein, for execution by a processor for configuring a computer to display tabular information in a graphical user interface (GUI) on a display screen, said computer program product comprising instructions and data for configuring a processor of the computer system to:
freeze the display of a first column or a first row of a table displayed in the GUI;
scroll the table to bring at least one other column or at least one other row into the GUI for display;
freeze the display of a second column from said at least one other column or a second row from said at least one other row; and
scroll between the two frozen columns or the two frozen rows in the GUI, whereby the respective columns or rows therebetween scroll in the table.

17. The computer program product of claim 16, wherein the instructions and data configure the execution of the processor to: scroll outside the columns or rows bounded by the two frozen columns or two frozen rows to bring at least one additional column or at least one additional row available for display into the GUI, such that one of the two frozen columns moves towards the other of the two frozen columns or one of the two frozen rows moves towards the other one of the two frozen rows to displace at least some of the respective columns or rows therebetween to accommodate the at least one additional column or at least one additional row.

18. The computer program product of claim 17 wherein the instructions and data configure the execution of the processor to: provide an option to freeze the display of selected columns including non-adjacent columns or selected rows including non-adjacent rows; and receive first input selecting at least one row or column for freezing.

19. The computer program product of claim 18 wherein the instructions and data configure the execution of the processor to:
receive second input to scroll the display of the table; and
ensure the display of the selected at least one row or column when scrolling the display of the table.

20. The computer program product of claim 16 wherein the instructions and data configure the execution of the processor to freeze a border row or border column of the table when scrolling the display of the table.

21. The computer program product of claim 20 wherein the instructions and data configure the execution of the processor to provide a UI control for displaying the table as a portion of a document being displayed on the display screen, said document navigable by moving a focus to scroll the document; and wherein the display of the table is invoked by scrolling to bring the UI control onto the display screen.

* * * * *